Aug. 9, 1938. G. J. REINITZ 2,126,663
STARCHING MACHINE
Filed Feb. 25, 1937 2 Sheets-Sheet 1

INVENTOR.
George J. Reinitz
BY Williams, Rich & Morse
ATTORNEYS

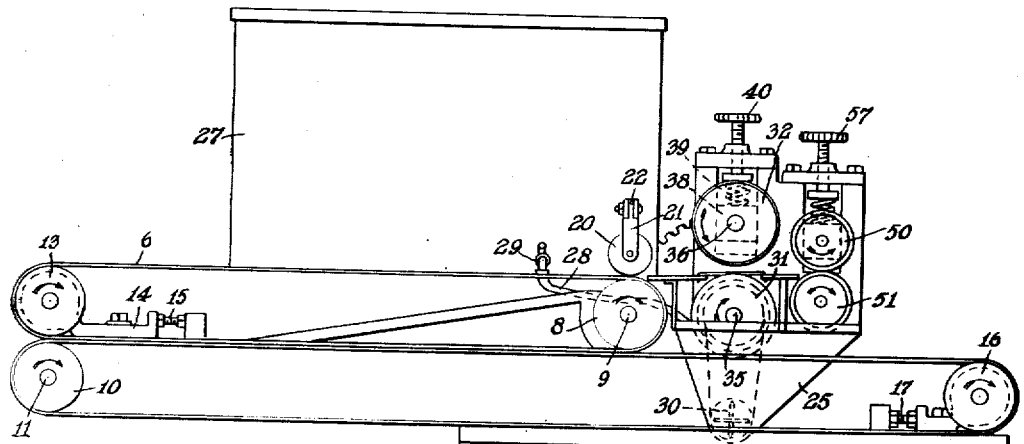
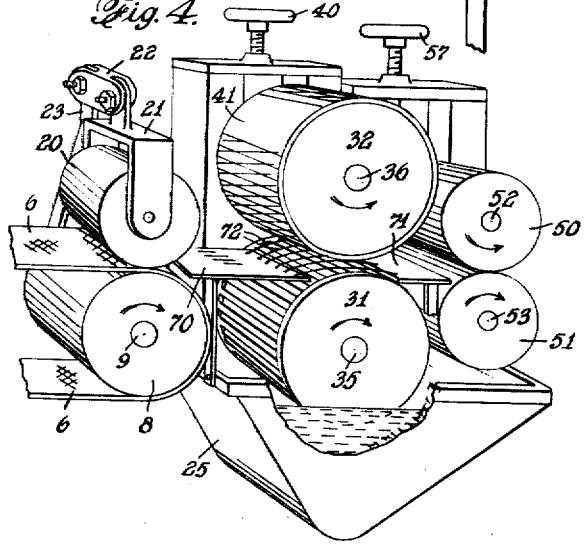
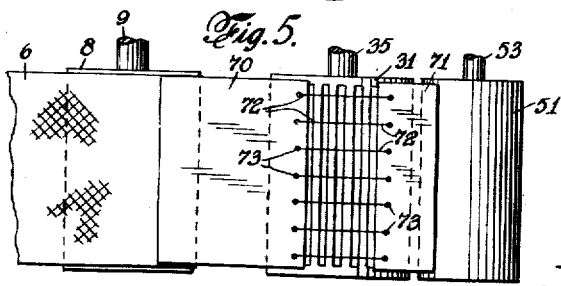

Patented Aug. 9, 1938

2,126,663

UNITED STATES PATENT OFFICE 2,126,663

STARCHING MACHINE

George J. Reinitz, Brooklyn, N. Y., assignor to United Laundry Machinery Corporation, New York, N. Y., a corporation of New York Application February 25, 1937, Serial No. 127,638

5 Claims. (Cl. 91—51)

The present invention relates to laundry machines and more particularly to a machine for applying starch to laundered articles or parts thereof prior to ironing.

The machine has for its principal object the impregnating with starch solution of such articles as the collars, cuffs and neckbands of shirts, detached collars and the like.

In spite of the fact that numerous machines for starching such articles have been devised from time to time these machines have either been too expensive or too inefficient and laundries are today almost universally starching collars and cuffs of shirts by hand-dipping for the obvious reason that it costs less.

The present invention provides a machine of simple construction which can be easily and inexpensively operated, which requires but a single operator and which will starch the aforesaid articles with an efficiency and speed far in excess of anything that could be done by hand or by prior machines.

The present preferred embodiment of the invention is shown in the attached drawings in which:

Fig. 3 is a front elevation;

Fig. 4 is a perspective showing the starching rolls and the parts closely related thereto, and Fig. 5 is a detail showing of a part of the mechanism for assuring the proper travel of the articles being starched through the machine.

The machine consists generally of a suitable pedestal and supporting framework upon which are assembled mechanism for applying and thoroughly working the starch into the clothing, a second group of mechanism including a pair of moving endless belts for delivering the clothing into the starching mechanism, and, lastly, wringing rollers for removing the excess starch.

The entire machine is run from a single source of power such as an electric motor.

Figure 1:
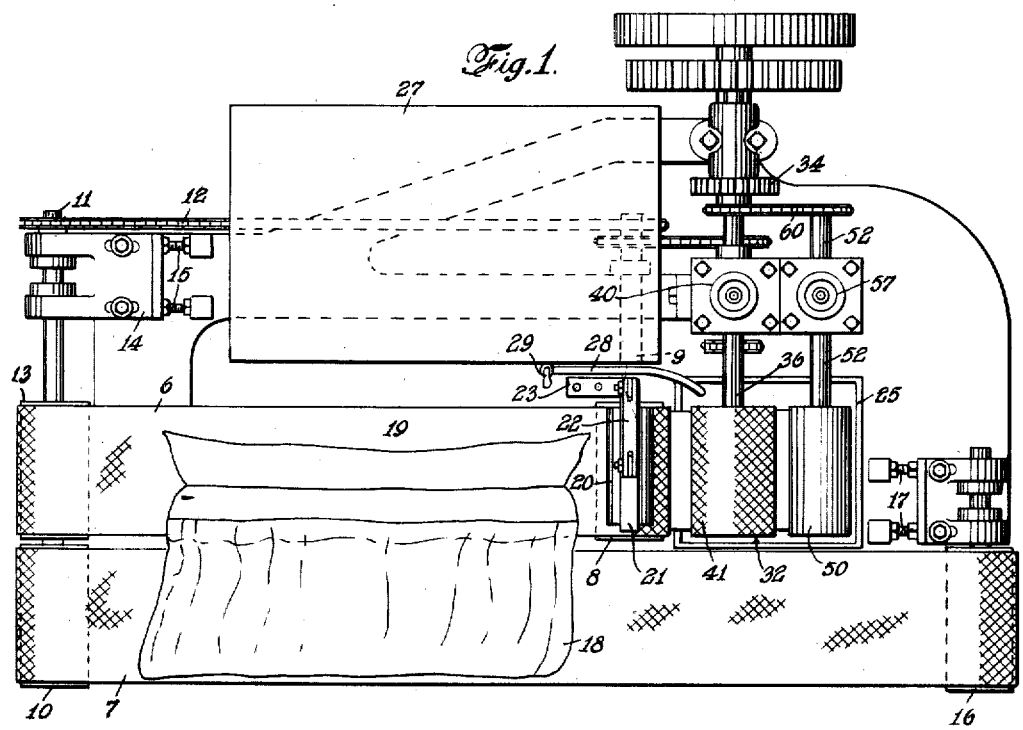
Fig. 1 is a plan view of the machine as seen from the above.
Figure 2:
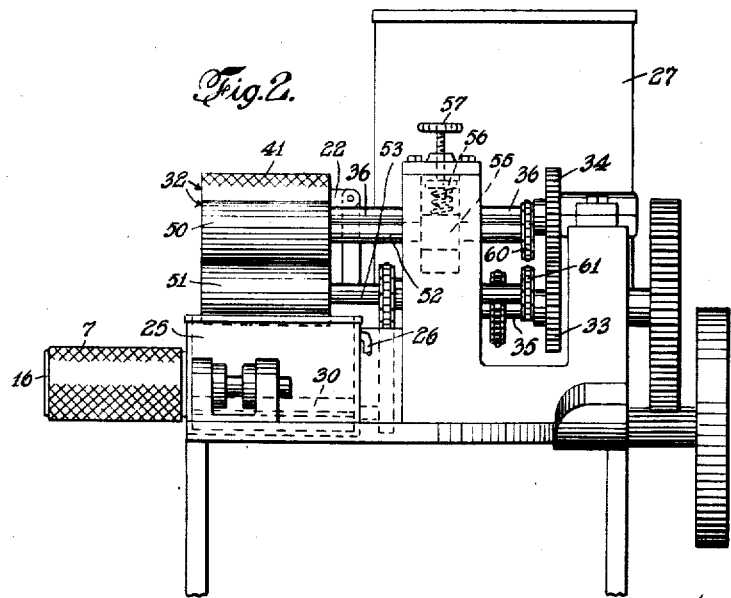
Fig. 2 is a side elevation of the machine as seen from the right of Fig. 1.

Referring to the drawings, particularly Figs. 1, 2 and 3, across the front of the machine are two endless belts, an upper belt 6 and a lower belt 7 which are mounted on carrying rollers which are capable of adjustment so that the belts may be tightened. The upper belt 6 is driven by the roller 8 mounted on the shaft 9. The lower belt 7 is driven by the roller 10 which is mounted on the shaft 11. The shafts 9 and 11 are connected together by chain 12 which runs on sprockets of equal diameters attached to said shafts so that their speed of rotation is equal. The left end of belt 6 is carried on the idler roller 13, the shaft of which is journaled in a sliding bracket 14, the position of which can be adjusted by the screws 15. The right end of the lower belt is similarly carried on the roller 16, the position of which may be adjusted by the screws 17.

The purpose of the upper belt is to carry articles into the starching mechanism while the lower belt is provided to support and to carry such parts of the articles as are not intended to be starched, for example the body of a shirt. For this reason the lower belt as shown in Fig. 1 extends the whole width of the machine so as to carry the body of the shirt 18 up to and past the starching mechanism and support it until the collar 19, for example, has passed through the starching mechanism and wringing rollers. As illustrated, the portion to be starched, for example the collar 19, is prepared for entrance into the starching mechanism by spreading it out on the upper belt 6. If the cuffs are also to be starched they are similarly spread out on the belt 6 on either side of the collar.

To provide for more positive feed and also to serve as a guard, a roller 20 is provided at the right-hand end of the belt 6. This roller is preferably made of bronze or other smooth, heavy material and is carried in bearings in a yoke 21 which is pivotally secured to the arm 22. This arm is freely pivoted to a stationary bracket 23 so that the roller 20, while being maintained in position at the end of the belt 6, is free to move up and down. By its own weight it presses the article onto the belt and in contacting with it it assures a positive feed. If the operator's hand is left on the belt 6 until it reaches the roller 20, the operator will be warned to withdraw his hand upon its striking said roller. However, if he does not withdraw it, it can pass freely under the roller without injury as the only pressure exerted thereon is that provided by the weight of the roller itself. The freely pivoted mounting by means of the arm 22 enables the roller to automatically accommodate itself to any thickness of article which is passing under it without any variation in pressure.

Immediately at the end of the upper belt 6 is an open-top V-shaped tank 25 in which the starch solution is contained. This tank is provided at its rear with an overflow 26, which may be run into any suitable container, and which assures a constant level of the solution in the tank.

The solution may be replenished from time to time as may be required from the reservoir 27 which is mounted at the back of the machine and is provided with a filling tube 28 in which is a valve 29. In order to assure the proper consistency of the starch solution in the tank 26 it is provided at its bottom with any suitable rotating agitator 30 which may be driven from any one of the convenient rotating shafts.

Mounted directly over the starch tank 26 is the starch-applying means which consists of a lower starching roll 31 and an upper starching roll 32. These rolls are mounted respectively on shafts driven by the meshing gears 33 and 34 which are of equal size and rotate at the same speed but in opposite directions. Power is supplied to the machine through the lower shaft 35 upon which the gear 33 is mounted. The upper roll 32 is carried on shaft 36 which has its forward bearing in a movable block 38 mounted so as to slide vertically in the frame and is pressed downwardly by the coil spring 39 which may be adjusted through the hand screw 40. By this arrangement it is possible to raise the upper roll 32 away from the lower roll 31 and to adjust the tension between them. In the drawings the rolls 31 and 32 are shown spaced apart but when operating they are in contact under pressure.

The construction and position of the two starching rolls 31 and 32 is of particular importance and it will be noted particularly from Fig. 4 that the lower roll, which is of some hard substance, preferably bronze, has a ribbed or corrugated surface. The upper roll 32 on the other hand is covered by a soft absorbent sleeve 41 which, for example may be a piece of heavy woven tubing made of cotton or wool.

The lower starching roll 31 rotates with its underside partly submerged in the starch solution which, being rather thick, is picked up in the corrugations and carried around out of the tank by the roll. After operating for a very short time the absorbent sleeve 41 of the roll 32 becomes saturated with starch solution. The corrugations constantly carry up a new supply of starch more rapidly than it can be used up. The cooperative relationship between the starching rolls 31 and 32, urged against each other by spring pressure, is such that the hard uneven surface of the lower roll 31 effects a kneading action against the soft surface of the roll 32 and squeezes the starch solution through any fabric which is passing between the rolls so that it is thoroughly impregnated with starch, the starch being supplied in part to the upper surface of the article by being squeezed from the absorbent sleeve 41 and in part to the lower surface of the article from the pockets of the roll 31. It is particularly to be noted that this complete starching action is carried out without submerging the article in a tank of starch solution.

While roll 31 is shown and referred to as "corrugated" and while this form has been found to be very effective it is not intended to limit the invention to this type of surface. Any surface which will function to carry starch up out of the tank and to effect a kneading action against the soft-surfaced roll 32 is within the scope of the invention. Other forms of uneven surfaces having pockets to carry starch will readily occur to those skilled in the art. For example, the surface might be checkered with rectangular depressions or provided with cup-like cavities.

As the article emerges at the right-hand side of the starching rolls 31 and 32 it contains an excess of starch over what is required and for the purpose of removing this starch the machine is fitted with a pair of wringing rollers consisting of the upper roller 50 and the lower roller 51. These rollers are carried on the shafts 52 and 53, respectively, the shaft 53 being mounted in a fixed bearing carried by the frame of the machine and the shaft 52 being carried in a manner similar to the upper starching roll 32, having its forward bearing in a sliding block 55 which is held down by the spring 56, the tension of which may be adjusted by the hand screw 57. These wringing rollers may be conveniently driven by sprocket and chain connections from the shafts of the starching rolls 31 and 32, as best shown in Figs. 1 and 2, the upper roller being driven by the chain 60 and the lower roller by the chain 61. This drive is so arranged that the wringing rollers have the same peripheral speed as the starching rolls, assuring smooth passage of articles through the machine.

It will be noted that the wringing rollers are positioned so that the starch squeezed out of the articles by them will drop back into the tank 26. This assures the utmost economy of starch.

Referring particularly to Fig. 5, it will be seen that between the end of the belt 6 and the lower starching roll 31 is a guide plate 70 which supports articles leaving the end of the belt 6 as they pass under the roller 20 and guides them to the top surface of the starching roll 31. A similar plate 71 bridges the gap between the starching roll 31 and the wringing roller 51. In order to prevent any tendency of the articles to stick to the starching roll 31 and travel around with it into the tank, suitable means are provided for stripping the articles away from the roll 31. These means are shown in Fig. 5 as a series of parallel smooth wires 72 which may be fastened into openings 73 in the plates 70 and 71. In order to prevent undue friction on these wires 72 which in time will tend to wear them out the roller 31 may have circumferential grooves provided on its surface so positioned and of sufficient depth to accommodate the wires 72. It will thus be seen that an article passing from the end of the belt 6 through to the wringing rolls is constantly supported. The area of the wires 72 is so small as to have no effect upon the thorough starching of the article as it passes between the starching rolls.

While the invention has been described in connection with a specific embodiment, modifications thereof are contemplated as within the purview of the appended claims.

What is claimed is:

1. In a machine for starching garments or parts thereof without submerging them in the starch solution, means for simultaneously applying and working in the starch comprising a single pair of rotatable cylindrical rolls of approximately equal size supported entirely from one side one above the other to permit the passage of less than a whole garment therebetween, the upper starching roll having a yielding absorbent covering on its cylindrical surface which becomes charged with starch solution by reason of its absorptive nature and applies it to the upper surface of a garment or part thereof passing between the rolls, the lower starching roll being of relatively non-absorbent material harder than said covering and having a longitudinally corrugated surface whereby starch solution supplied to the surface of the lower roll will be carried upward in substantial quantities by the corrugations as the roll rotates and applied thereby directly to the lower surface of said garment, means for maintaining the rolls in contact under a yielding pressure, means for supplying starch to the surface of the lower roll, and means for rotating the rolls with the same peripheral speed.

2. In a starching machine for applying starch simultaneously to opposite sides of and working it into a garment or a part thereof by means of a single pair of starch-applying rolls of approximately equal size positioned one above the other and without submerging the article to be starched in the starch solution, an upper roll having a soft absorbent surface for applying starch to the upper side of an article, means for applying starch to the underside of the article comprising a lower starching roll of hard material, the surface of said lower roll being substantially covered with closely spaced depressions, means for supplying starch to said surface whereby the starch is carried upward in said depressions in substantial quantities as the roll directly rotates and is applied by the roll to the underside of said article, and means for rotating both rolls in contact at the same peripheral speed.

3. In a starching machine for applying starch simultaneously to opposite sides of and working it into a garment or a part thereof by means of a single pair of contacting starch-applying rolls of approximately equal size positioned one above the other and without submerging the article to be starched in the starch solution, an upper roll having a yielding surface, means for delivering starch to the underside of the article comprising a lower starching roll of hard material, the surface of said lower roll being longitudinally corrugated on its cylindrical surface to form alternate ridges and grooves parallel with the axis of rotation, means for supplying starch to the surface of said lower roll whereby the starch is lifted up by the roll and carried between the ridges to the underside of the article and applied directly thereto in substantial quantities, said ridges also functioning to knead the starch into the article by coacting with the yielding surface of the upper roll.

4. A machine for starching only a part of a garment comprising, in combination, a pair of starch receiving and applying rolls, a first moving endless belt adapted to receive the part of the garment to be starched and feed it between the rolls, a second moving endless belt adjacent the first belt and running parallel thereto and beyond the starching rolls for carrying the rest of the garment, a roller of heavy material supported on a freely pivoted arm with its axis of rotation at right angles to the direction of travel of the first belt and adapted to bear down upon the top surface of the first belt near its discharge end, whereby frictional engagement of the garment part to be starched with the first belt and positive delivery thereof into the starching rolls is assured while the remaining part of the garment is carried past said rolls by the second belt.

5. A machine for starching only a part of a garment comprising, in combination, a pair of starch receiving and applying rolls, a first moving endless belt adapted to receive the part of the garment to be starched and feed it between the rolls, a second moving endless belt adjacent the first belt and running parallel thereto and beyond the starching rolls for carrying the rest of the garment, a roller supported on a freely pivoted arm with its axis of rotation at right angles to the direction of travel of the first belt and adapted to press down upon the top surface of the first belt near its discharge end with a freely yielding pressure, whereby frictional engagement of the garment part to be starched with the first belt and positive delivery thereof into the starching rolls is assured while the remaining part of the garment is carried past said rolls by the second belt.

GEORGE J. REINITZ.

CERTIFICATE OF CORRECTION.

Patent No. 2,126,663. August 9, 1938.

GEORGE J. REINITZ.

It is hereby certified that error appears in the printed specification of the above numbered patent requiring correction as follows: Page 3, first column, line 23, claim 2, strike out the word "directly" and insert the same after "roll", line 24, same claim; and that the said Letters Patent should be read with this correction therein that the same may conform to the record of the case in the Patent Office.

Signed and sealed this 27th day of September, A. D. 1938.

Henry Van Arsdale (Seal) Acting Commissioner of Patents.

corrugations as the roll rotates and applied thereby directly to the lower surface of said garment, means for maintaining the rolls in contact under a yielding pressure, means for supplying starch to the surface of the lower roll, and means for rotating the rolls with the same peripheral speed.

2. In a starching machine for applying starch simultaneously to opposite sides of and working it into a garment or a part thereof by means of a single pair of starch-applying rolls of approximately equal size positioned one above the other and without submerging the article to be starched in the starch solution, an upper roll having a soft absorbent surface for applying starch to the upper side of an article, means for applying starch to the underside of the article comprising a lower starching roll of hard material, the surface of said lower roll being substantially covered with closely spaced depressions, means for supplying starch to said surface whereby the starch is carried upward in said depressions in substantial quantities as the roll directly rotates and is applied by the roll to the underside of said article, and means for rotating both rolls in contact at the same peripheral speed.

3. In a starching machine for applying starch simultaneously to opposite sides of and working it into a garment or a part thereof by means of a single pair of contacting starch-applying rolls of approximately equal size positioned one above the other and without submerging the article to be starched in the starch solution, an upper roll having a yielding surface, means for delivering starch to the underside of the article comprising a lower starching roll of hard material, the surface of said lower roll being longitudinally corrugated on its cylindrical surface to form alternate ridges and grooves parallel with the axis of rotation, means for supplying starch to the surface of said lower roll whereby the starch is lifted up by the roll and carried between the ridges to the underside of the article and applied directly thereto in substantial quantities, said ridges also functioning to knead the starch into the article by coacting with the yielding surface of the upper roll.

4. A machine for starching only a part of a garment comprising, in combination, a pair of starch receiving and applying rolls, a first moving endless belt adapted to receive the part of the garment to be starched and feed it between the rolls, a second moving endless belt adjacent the first belt and running parallel thereto and beyond the starching rolls for carrying the rest of the garment, a roller of heavy material supported on a freely pivoted arm with its axis of rotation at right angles to the direction of travel of the first belt and adapted to bear down upon the top surface of the first belt near its discharge end, whereby frictional engagement of the garment part to be starched with the first belt and positive delivery thereof into the starching rolls is assured while the remaining part of the garment is carried past said rolls by the second belt.

5. A machine for starching only a part of a garment comprising, in combination, a pair of starch receiving and applying rolls, a first moving endless belt adapted to receive the part of the garment to be starched and feed it between the rolls, a second moving endless belt adjacent the first belt and running parallel thereto and beyond the starching rolls for carrying the rest of the garment, a roller supported on a freely pivoted arm with its axis of rotation at right angles to the direction of travel of the first belt and adapted to press down upon the top surface of the first belt near its discharge end with a freely yielding pressure, whereby frictional engagement of the garment part to be starched with the first belt and positive delivery thereof into the starching rolls is assured while the remaining part of the garment is carried past said rolls by the second belt.

GEORGE J. REINITZ.

---

CERTIFICATE OF CORRECTION.

Patent No. 2,126,663.                 August 9, 1938.

GEORGE J. REINITZ.

It is hereby certified that error appears in the printed specification of the above numbered patent requiring correction as follows: Page 3, first column, line 23, claim 2, strike out the word "directly" and insert the same after "roll", line 24, same claim; and that the said Letters Patent should be read with this correction therein that the same may conform to the record of the case in the Patent Office.

Signed and sealed this 27th day of September, A. D. 1938.

Henry Van Arsdale (Seal)                             Acting Commissioner of Patents.